US010399705B2

United States Patent
Sontag et al.

(10) Patent No.: US 10,399,705 B2
(45) Date of Patent: Sep. 3, 2019

(54) METHOD FOR SEALING A COMPONENT IN A VEHICLE CABIN

(71) Applicant: Airbus Operations GmbH, Hamburg (DE)

(72) Inventors: Stephan Sontag, Hamburg (DE); Benedikt Kircher, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 111 days.

(21) Appl. No.: 15/365,536

(22) Filed: Nov. 30, 2016

(65) Prior Publication Data
US 2017/0152062 A1   Jun. 1, 2017

(30) Foreign Application Priority Data
Nov. 30, 2015 (DE) .................. 10 2015 120 785

(51) Int. Cl.
*B64F 5/10* (2017.01)
*B64D 11/06* (2006.01)
*F16J 15/02* (2006.01)

(52) U.S. Cl.
CPC ............ *B64F 5/10* (2017.01); *B64D 11/0627* (2014.12); *B64D 11/0646* (2014.12); *F16J 15/02* (2013.01); *Y02T 50/46* (2013.01)

(58) Field of Classification Search
CPC .... B64F 5/10; F16J 15/02; F16J 15/06; B64D 45/00; B64D 11/0646; Y02T 50/46
See application file for complete search history.

(56) References Cited

U.S. PATENT DOCUMENTS

| 2,332,841 | A | * | 10/1943 | Buckwalter | B64D 11/06 105/315 |
| 2,925,050 | A | * | 2/1960 | Candlin, Jr. | B61D 17/08 105/397 |
| 5,474,337 | A | * | 12/1995 | Nepsund | F16L 21/03 285/345 |
| 6,158,690 | A | * | 12/2000 | Wadey | B64C 1/066 244/117 R |
| 6,682,119 | B1 | * | 1/2004 | Droulez | B60H 1/00564 296/208 |
| 6,739,552 | B2 | * | 5/2004 | Sankrithi | B64D 11/06 244/118.6 |

(Continued)

OTHER PUBLICATIONS

German Search Report cited in 10 2015 120 785.0 dated Aug. 18, 2016, seven pages.

*Primary Examiner* — Eugene G Byrd
(74) *Attorney, Agent, or Firm* — Nixon & Vanderhye P.C.

(57) ABSTRACT

A process for manufacturing a vehicle cabin part (1) to fit in a gap (9) between a first component (5) and a second component (7) including: providing different sealing bodies (3') each having a first lateral face (11') conforming to an inner surface (17') of the first component (5') and a second lateral face (13') spaced a certain distance (15') from the first lateral face (11'); select one of the sealing bodies having a certain distance that fits the gap (9) between the first component (5) and the second component (7); insert the selected sealing body (3) into the gap (9) such that the first lateral face (11) at least partially adjoins the inner surface (17) of the first component (5) and the second lateral face (13) at least partially adjoins the outer surface (21) of the second component (7) facing the first component (5).

19 Claims, 3 Drawing Sheets

(56) References Cited

U.S. PATENT DOCUMENTS

| | | | |
|---|---|---|---|
| 6,766,985 B2* | 7/2004 | Dussac | B64C 1/066 244/117 R |
| 7,891,671 B2* | 2/2011 | Allford | F16J 15/027 137/15.1 |
| 8,974,891 B2* | 3/2015 | Riedell | B32B 18/00 156/289 |
| 9,962,917 B2* | 5/2018 | Inserra Imparato | B32B 37/1018 |
| 2004/0124311 A1* | 7/2004 | Kordel | B64C 3/26 244/131 |
| 2013/0037655 A1* | 2/2013 | Bradley | B64C 3/26 244/124 |
| 2013/0062468 A1* | 3/2013 | Yokoi | B64C 1/1492 244/129.3 |
| 2014/0138919 A1* | 5/2014 | Barrall | F16J 15/02 277/590 |
| 2014/0197278 A1* | 7/2014 | Cheung | B64C 1/066 244/131 |
| 2014/0197606 A1* | 7/2014 | Jeanne | F16J 15/024 277/644 |
| 2014/0300149 A1* | 10/2014 | Lightbody | B60N 2/466 297/188.14 |
| 2015/0042048 A1* | 2/2015 | Nuennerich | F16J 13/02 277/642 |
| 2015/0219217 A1* | 8/2015 | Villani | F16J 15/021 277/637 |
| 2016/0271644 A1* | 9/2016 | Weinmann | B05D 1/26 |

* cited by examiner

METHOD FOR SEALING A COMPONENT IN A VEHICLE CABIN

RELATED APPLICATION

This application claims priority to German patent application DE 10 2015 120 785.0 filed Nov. 30, 2015, the entirety of which is incorporated by reference.

BACKGROUND OF THE INVENTION

The present invention relates to a process for manufacturing a vehicle cabin part, such as an aircraft cabin part, wherein a gap between a first component, such as a cabin wall, and a second component adjacent to the first component, such as a seat adjacent to the cabin wall, such as a passenger seat, is sealed.

Aircraft cabin parts having a gap between a cabin wall and a seat adjacent to the cabin wall are sufficiently well known from the prior art. Sealing such a gap is also known. This is done, in particular, for operational and safety reasons, as well as for aesthetic reasons. Sealing the gap also permits protecting the privacy of the passengers, which is particularly necessary in business class. In business class and first class, the seats are larger and have a more rounded, more compact shape than in economy class, i.e. in particular there, sealing the gap is also useful for safety reasons, for instance, hiding inadmissible objects in the lateral gap is prevented.

However, it is disadvantageous that, particularly in business class, the cabin walls are strongly curved and thus have a complex profile, as business class is usually arranged in the front area of the fuselage in which the cabin walls taper to the nose of the aircraft and the seat rows are spaced at a greater distance. This also changes the position of the individual seats adjacent to the cabin wall relative to the cabin wall and thus the width of the gap for every individual seat in business class.

Usually, therefore, the seat is placed as closely as possible to the cabin wall to minimize the width of the gap. The remaining gap is usually sealed individually by means of a sealing body, which is adapted on-site in the aircraft cabin. The sealing body is frequently cut by hand and in that way adapted to the width of the gap and to the contours of the cabin wall and adjacent to the seat. The sealing body is therefore custom-made for every individual gap.

For that reason, the gap usually having a very complex shape due to the different contours of the cabin wall and the adjacent seat renders the situation difficult. Because every individual sealing compound is manufactured by hand, sealing the gap is very time- and cost-intensive.

SUMMARY OF THE INVENTION

The present invention addresses the problem of manufacturing a vehicle cabin part by which a gap between a first component and a second component adjacent to the first component is sealed in a particularly efficient manner.

This problem is solved by a process comprising the following steps:

(a) Providing a vehicle cabin part of a certain type having a first component and a second component adjacent to the first component, a gap being present between the first component and the second component. The vehicle cabin part may be an aircraft cabin part, i.e. the type of cabin part depends, for instance, on an aircraft type or on the corresponding seating class. Likewise, the vehicle cabin part can be a cabin part of a train or a bus.

(b) Providing a plurality of different sealing bodies, every sealing body comprising a first lateral face and a second lateral face opposite the first lateral face, the first lateral face of every sealing body having a shape, which is a negative image of the inner surface of the first component of a certain type of vehicle cabin part facing the second component, and the second lateral face of every sealing body having a certain distance from the first lateral face, i.e., the sealing body has a certain thickness, which is defined by the distance between the second lateral face and the first lateral face. A negative image in the sense of the present invention is an image, which can also have slight deviations from the exact shape of the inner surface of the first component facing the second component, i.e. it can represent a simplified supposition of the shape of the first component. Any slight deviations can then be compensated by a flexible design of the sealing body.

(c) Selecting a suitable sealing body from the plurality of sealing bodies, the first lateral face of which has a shape, which is a negative image of the inner surface of the first component of the vehicle cabin part, and the second lateral face of which is at such a distance from the first lateral face that the sealing body may fit into the gap between the first component and the second component in a form-fitting manner.

(d) Inserting the selected sealing body into the gap such that the first lateral face at least partially adjoins the inner surface of the first component and the second lateral face at least partially adjoins the outer surface of the second component facing the first component. For that purpose, the selected sealing body may be attached in the gap, for instance at the inner surface of the first component or at the outer surface of the second component facing the first component. The first lateral face may at least partially adjoin the inner surface of the first component in a form-fitting manner and the second lateral face at least partially adjoins the outer surface of the second component facing the first component in a form-fitting manner.

The process according to an embodiment of the invention is used to produce a vehicle cabin part comprising a first component and at least one second component adjacent to the first component. A gap, which is sealed by the process according to the invention, is present between the first component and the second component adjacent to the first component.

If such a gap between the first component and a second component, which is adjacent to the first component, is to be sealed for a vehicle cabin part of a certain type, a suitable sealing element is selected from a plurality of different sealing bodies by the process according to the invention. The various sealing bodies can be manufactured in a standardized manner as identical parts, and stored in a central storage, e.g. close to an airport or a railway station, each of the different sealing bodies having a first lateral face adapted to the type of the vehicle cabin part by having a shape which is already adapted to the contour of the inner surface of the first component of the vehicle cabin part facing the second component. In this way, depending on the type of the vehicle cabin part, a sealing body can be used, the first lateral face of which is already adapted to the contour of the inner surface of the first component. This saves time, as the first lateral face no longer has to be adapted on site.

The selected sealing body can then be directly inserted into the gap between the inner surface of the first component facing the second component and the second component. In addition, the sealing body is attached in this gap, the sealing may be executed in a form-fitting manner. The form-fitting sealing of the gap is advantageous from an aesthetic point of view as the sealing body rests against the first component or the second component and there are no unintentional gaps.

Thus, the process according to the invention has the advantage that a plurality of sealing bodies having a first lateral face that is adapted to the complex contour of the inner surface of the first component is already prefabricated. The suitable sealing body can then be selected from this plurality of sealing bodies, depending on the type of the vehicle cabin part, to seal a gap between a first component and a second component adjacent to the first component. This makes for an efficient sealing of the gap, i.e. a more efficient manufacturing process of the vehicle cabin part.

The vehicle cabin part may be an aircraft cabin part, wherein the first component may be a cabin wall and the second component may be a seat. The second component may be a passenger seat, namely the passenger seat, which is directly adjacent to the first component in the corresponding seating row of an aircraft, but is not connected to the latter. Thus a gap, which is sealed by the process described herein, is present between the first component and the second component adjacent to the first component.

The process according to the invention is not limited to a specific vehicle cabin part. It can be a cabin part of several means of travel, for instance of an aircraft, a train or a bus. It is possible for a gap to be present between the first component, for instance the cabin wall or the side wall, and a different component adjacent to the first component, for instance a seat, a storage space or a luggage compartment. Likewise, the gap to be sealed can also be present between two individual components within the vehicle cabin part, such as, for instance, between two adjacent seats, which is sealed with a suitable sealing body.

In an embodiment, the selected sealing body is formed from may be a flexible, foam-like, material. The selected sealing body thus does not contain any solid components, i.e. the thickness of the sealing body can be changed and the latter can be deformed. After the selected sealing body has been inserted into the gap, the second lateral face can flexibly adapt to the shape of the outer surface of the second component facing the first component, resulting in a form-fitting seal of the gap.

In another embodiment, the selected sealing body is cut out of a sealing body preform using water-jet cutting, based on a three-dimensional model of the inner surface of the first component of the corresponding type of vehicle cabin part. The water-jet cutting process may be computer-controlled to form a very precise contour of the sealing body.

Water-jet cutting can be used to process a multiplicity of materials, in particular foamy materials, but also more solid materials, such as metal, plastic or leather. Any desired complicated shape, such as that of the first lateral face of the sealing body adapted to the surface of the first component, can be cut out particularly precisely. A high-pressure water-jet is used to cut out the first lateral face of the sealing body using water-jet cutting to have its shape represent a negative image of the inner surface of the first component. The water-jet cutting being computer controlled, the sealing body can be adapted automatically to the shape of the inner surface of the first component. This can be done anywhere outside of the vehicle cabin part, and manual manufacture can be dispensed with. As an alternative to water-jet cutting, the selected sealing body can be cut or formed using a computerized numerical control (CNC) machine or a 3D printer.

The selected sealing body may be adapted to the contour of the second component in a cross-section viewed in parallel to the first component, when the sealing body is inserted in the gap. Viewed in a plane parallel to the first component, the selected sealing body otherwise has a shape, which represents an extension of the contours of the second component towards the first component. The selected sealing body may be adapted to the contour of the second component by means of water-jet cutting, alternatively, however, a CNC machine or a 3D-printer is also suitable for adapting the selected sealing body. The sealing body thus has a peripheral wall transverse to the first and second lateral faces, which is adapted to the contour of the second component, in particular to the contour of the outer surface of the second component facing the first component. The sealing body thus has the effect of optically extending the second component.

In another embodiment, the selected sealing body is adapted after its selection and before the insertion of the sealing body into the gap. Thus, the sealing body can be inserted into the gap and fixed in the latter without further adjustments of the sealing body being required. Alternatively, the adaptation may be done before the selection, i.e. the plurality of different sealing bodies is already provided in the adapted state.

In another embodiment, the second lateral face of the selected sealing body is formed planar. The second lateral face therefore does not have to be processed by water-jet cutting, CNC processes or 3D printing. In the case of a flexible material, after insertion of the selected sealing body, it can adapt to the shape of the outer surface of the second component facing the first component, so that the second lateral face can adjoin the outer surface of the second component in a form-fitting manner and can possibly be connected thereto.

In a further embodiment, the second lateral face of the selected sealing body is adapted to the shape of the outer surface of the second component facing the first component, such as in a form-fitting manner. Adapting the second lateral face of the selected sealing body is done in the same manner that was used for its first lateral face, such as by means of water-jet cutting, and may be computer controlled. Alternatively, the second lateral face can be adapted by means of a computer numerical controlled (CNC) machine or 3D printer. The selected sealing body may be adapted after its selection and before the insertion of the sealing body into the gap. In this way, the sealing body can be inserted into the gap and attached in the same without further adjustments to the sealing body being necessary. Alternatively, adaptation can also be conducted before selection, i.e. the plurality of different sealing bodies is already provided in an adapted manner.

The second lateral face may represent a negative image of the outer surface of the second component and has a shape adapted to it, before the sealing body is inserted into the gap. In this way, a form-fitting connection between the sealing body and the outer surface of the second component can be established. Adapting the second lateral face is also advantageous if the sealing body is formed from a non-deformable material, in particular its second lateral face, and is not formed from a flexible, such as a foam-like, material.

In an embodiment, the selected sealing body is hollowed out, such as by water-jet cutting, a CNC machine or a three-dimensional (3D) printer. Hollowing-out may be effected in a single step with the adaptation to the contour of the second component. The sealing body internally hollowed-out makes for a considerable reduction in weight.

In another embodiment, the selected sealing body is hollowed out in such a way that it has a cavity, the shape of which is adapted to the outer contour of the sealing body. Only the peripheral wall transversely to the first and second lateral faces, which is adapted to the contour of the second component, in particular to the contour of the outer surface of the second component facing the first component, is left in the sealing body. Due to hollowing-out, the first and second lateral faces of the sealing body are designed open and formed as thin-walled structures. In doing so, the weight of the sealing body can be reduced as it only covers the visible areas when it is inserted into the gap.

In a further embodiment, the selected sealing body is attached to the second component or to the first component, wherein the sealing body is attached to a support structure, and wherein the support structure is attached to the second component or the first component. The sealing body may be glued to the support structure, and the support structure is attached to the second component or the first component such as by means of screw elements. This allows easy attachment, wherein the sealing body is, by means of a support structure, firmly connected to the first component or to the outer surface of the second component facing the first component.

Finally, the selected sealing body may be provided with a cover. The cover can, for instance, be made of leather, fabric or plastic materials and is used for surface sealing and for the aesthetic design of the sealing body. The color or the material of the cover can be adapted to the color or the material of the second component and/or the first component. The selected sealing body may be provided with the cover after the shape has been adapted and before its insertion into the gap.

Another aspect of the present invention relates to a vehicle cabin part, such as an aircraft cabin part.

The vehicle cabin part comprises a first component, such as a cabin wall, and a second component, adjacent to the first component, such as a seat adjacent to the cabin wall, wherein a gap is present between the first component and the second component, and wherein a sealing body is provided in the gap, the former having a first lateral face and a second lateral face opposite the first lateral face. The first lateral face of the sealing body has a shape representing a negative image of the inner surface of the first component and adjoins the same. The second lateral face of the sealing body has a distance from the first lateral face such that it adjoins the outer surface of the second component facing the first component.

The inner surface of the first component faces the second component, and the second lateral face of the sealing body may adjoin the inner surface of the first component in a form-fitting manner. The sealing body has a certain thickness, which is defined by the distance between the second lateral face and the first lateral face. The second lateral face adjoins the outer surface of the second component facing the first component at least partly.

The vehicle cabin part according to the invention has a first component and at least one second component adjacent to the first component. The second component may be a passenger seat, specifically that passenger seat, which is directly adjacent to the first component in the individual rows of seats of an aircraft, but is not connected thereto. Thus, there is a gap between the first component and the second component adjacent to the first component.

The gap between the first component and a second component for a vehicle cabin part of a certain type, adjacent to the first component, is sealed by a sealing body, which has a first lateral face, which is adapted to the type of the vehicle cabin part by having a shape that is already adapted to the contour of the inner surface of the first component of the vehicle cabin part facing the second component.

The sealing body is additionally attached in the gap, the sealing being form-fitting. The form-fitting sealing of the gap is advantageous from aesthetic and practical points of view. The vehicle cabin part according to the invention has the advantage that, depending on the type of the vehicle cabin part, which can be, for instance, a cabin part of an aircraft, a train or a bus, the gap between a first component and a second component adjacent to the first component is effectively sealed by a suitable sealing body.

The second lateral face of the sealing body may have a shape representing a negative image of the outer surface of the second component facing the first component and adjoins the same. The second lateral face may adjoin the outer surface of the second component in a form-fitting manner.

In this way, a form-fitting connection between the sealing body and the outer surface of the second component can be established. Adapting the second lateral face is also advantageous if the sealing body is formed from a non-deformable material, in particular at its second lateral face, and is not formed from a flexible, such as a foam-like material.

Finally, the selected sealing body is attached to the first component or to the second component, wherein the sealing body is attached to a support structure, and wherein the support structure is attached to the first component or the second component.

The sealing body may be glued to the support structure and the support structure may be attached to the second component or to the first component by means of screw elements. This allows a form-fitting sealing of the gap, by firmly connecting the sealing body by means of a support structure to the first component or the outer surface of the second component facing the first component.

In an embodiment, the sealing body is formed from a flexible, such as a foam-like, material. The sealing body thus has a variable thickness and can be deformed. The second lateral face can then flexibly adapt to the shape of the outer surface of the second component facing the first component, resulting in a form-fitting seal of the gap.

The selected sealing body may be adapted to the contour of the second component in a cross-section viewed in parallel to the first component, when the sealing body is inserted in the gap. Viewed in a plane parallel to the first component, the selected sealing body has a shape, which represents an extension of the contours of the second component towards the first component. The sealing body thus has a peripheral wall transverse to the first and second lateral faces, which is adapted to the contour of the second component, in particular to the contour of the outer surface of the second component facing the first component. The sealing body thus has the effect of optically extending the second component.

In another embodiment, the second lateral face of the sealing body is planar. In the case of a flexible material, it can adapt to the shape of the outer surface of the second component facing the first component.

In an embodiment, the selected sealing body is hollowed out, such as using water-jet cutting, a CNC machine or a 3D printer. This considerably reduces the weight of the sealing body.

In another embodiment, the sealing body is hollowed out in such a way that it has a cavity, the shape of which is adapted to the outer contour of the sealing body. Only the peripheral wall transversely to the first and second lateral faces, which is adapted to the contour of the second component, in particular to the contour of the outer surface of the second component facing the first component, is left in the sealing body. Due to hollowing-out, the first and second lateral faces of the sealing body may be designed open, thus forming the sealing body as a thin-walled structure. Thus, the weight of the sealing body is reduced, as it only comprises the area visible from the outside.

Finally, the selected sealing body may be provided with a cover. The cover can, for instance, be made of leather, fabric or plastic materials and is used for surface sealing and for the aesthetic design of the sealing body. The color or the material of the cover can be adapted to the color or the material of the second component and/or the first component. The selected sealing body may be provided with the cover after the shape has been adapted and before its insertion into the gap.

SUMMARY OF THE DRAWINGS

The present invention is explained in more detail below with reference to drawings depicting exemplary embodiments, in which.

DETAILED DESCRIPTION OF THE INVENTION

Figure 1:
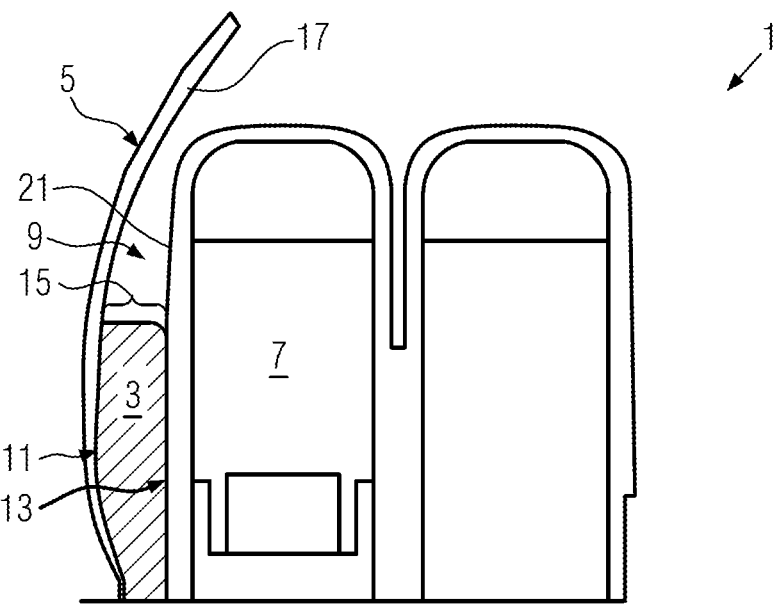
FIG. 1 shows a cross-section through a vehicle cabin part produced by the process according to the invention.
Figure 2:
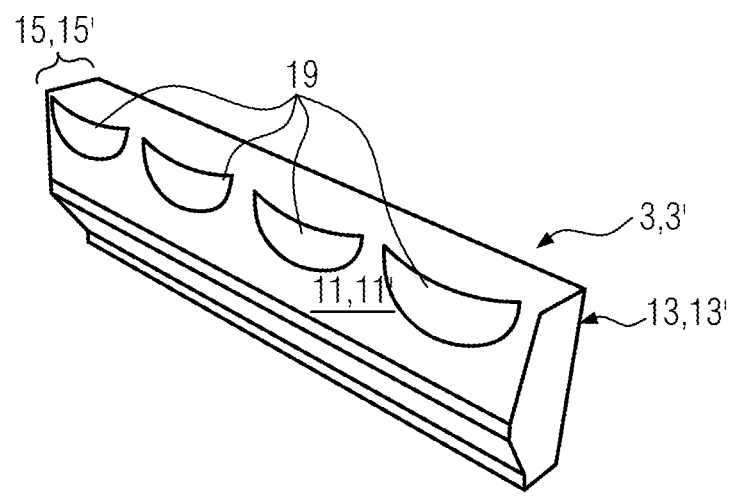
FIG. 2 shows a perspective view of a sealing body.
Figure 3:
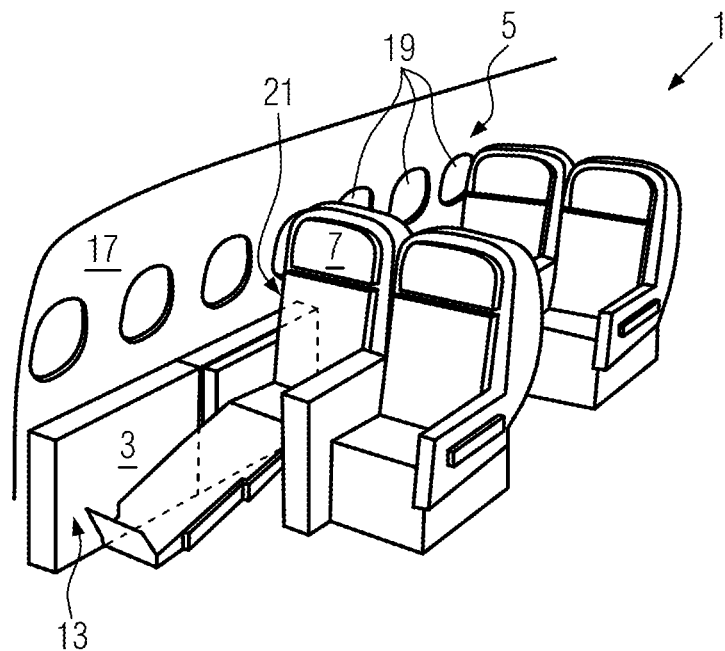
FIG. 3 shows a perspective view of the vehicle cabin part of FIG. 1.
Figure 4:
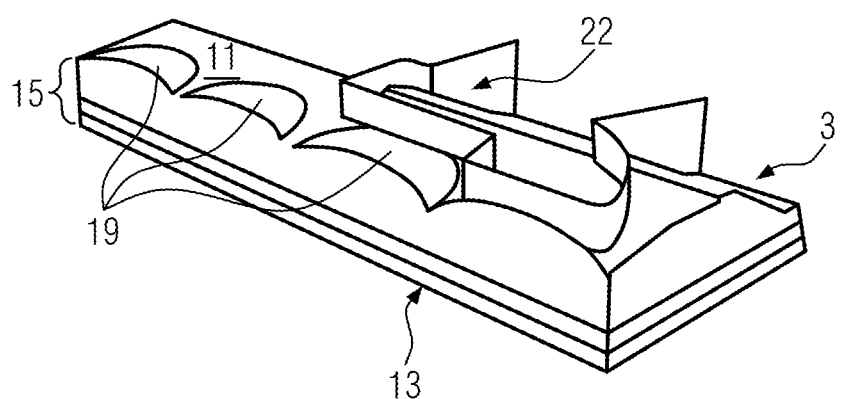
FIG. 4 shows another perspective view of the sealing body of FIG. 2.
Figure 5:
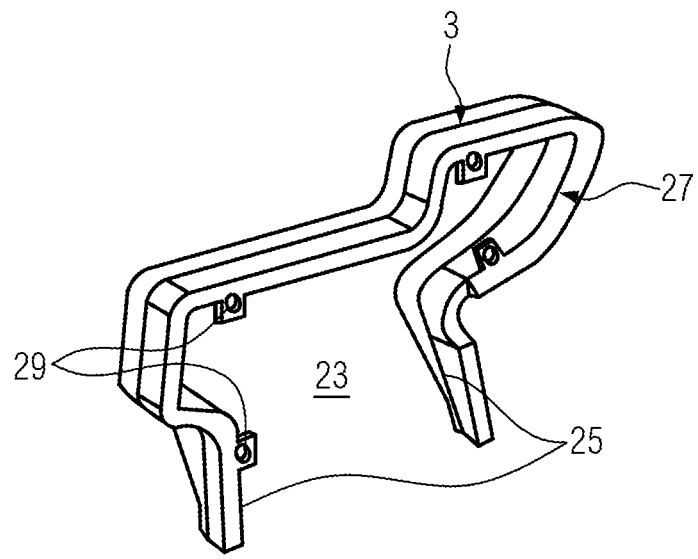
FIG. 5 shows a perspective view of the hollowed-out sealing body.
Figure 6:
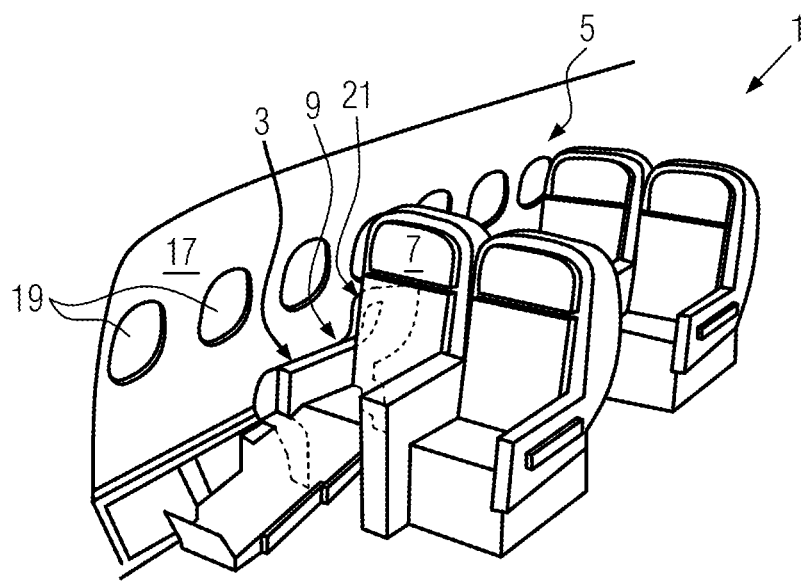
FIG. 6 shows a perspective view of the vehicle cabin part having adapted sealing bodies inserted into the gap.

An exemplary embodiment of a process according to the invention for manufacturing a vehicle cabin part 1, in the present exemplary embodiment an aircraft cabin part 1, is described below with reference to FIGS. 1 to 6. The vehicle cabin part comprises a first component 5 and a second component 7, the first component 5 being a cabin wall and the second component 7 being a seat adjacent to the cabin wall. FIGS. 1, 3 and 6 show the vehicle cabin part 1 according to the invention and FIGS. 2, 4 and 5 show a sealing body 3.

As shown in FIG. 1, a vehicle cabin part 1 of a certain type is provided, the type being, for instance, dependent on the type of aircraft. The vehicle cabin part 1 has a first component 5 and a second component 7 adjacent to the first component 5, wherein the second component 7 is a passenger seat, which is directly adjacent to the first component 5 in the passenger seat row, but is not connected thereto. Thus, there is a gap 9 between the second component 7 and the first component 5, into which a sealing body 3 is inserted for sealing purposes based on the present process.

To this end, a plurality of different sealing bodies 3' is provided. Each of the sealing bodies 3' comprises a first lateral face 11' and a second lateral face 13' opposite the first lateral face 11'. The first lateral face 11' of every sealing body 3' has a shape which is a negative image of the inner surface 17' of the first component 5' of a certain type of vehicle cabin part 1'. The second lateral face 13' of every sealing body 3' has a specific predetermined distance 15' from the first lateral face 11'. The sealing bodies 3' are cut from a sealing body preform by means of computer-controlled water-jet cutting, using a three-dimensional model of the inner surface 17' of the first component 5' of the corresponding type of vehicle cabin part 1'.

Then, a suitable sealing body 3 is selected from the plurality of sealing bodies, which comprises a first lateral face 11 and a second lateral face 13 opposite the first lateral face. The sealing body 3 has a certain thickness, which depends on the distance 15 between the two lateral faces 11, 13. The sealing body 3 is formed from a flexible, foam-like material.

As shown in FIG. 2, the first lateral face 11 of the selected sealing body 3 is adapted to the inner surface 17 of the first component 5. The first lateral face 11 thus has a shape, which is a negative image of the inner surface 17 of the first component 5 of the vehicle cabin part 1 facing the second component 7. The shape of the first lateral face 11 is adapted to the course of the inner surface 17 of the first component 5 in such a way that the shape of the individual structural features of the first component 5, such as, for instance, the cabin windows 19, are also represented as a negative image on the first lateral face 11. The second lateral face 13 of the selected sealing body 3 is planar.

The selected sealing body 3 is further adapted as described below, before it is inserted into the gap 9 between the first component 5 and the second component 7. The selected sealing body 3 is adapted by computer-controlled water-jet cutting. The sealing body 3 is cut out to give it the complex contours of the outer surface 21 of the second component 7 facing the first component 5. I.e., the second lateral face 13 is adapted to the shape of the outer surface 21 of the second component 7 facing the first component 5. As shown in FIG. 3, the distance 15 between the second lateral face 13 and the first lateral face 11 is selected such and the second lateral face 13 is adapted such that the sealing body 3 fits in a form-fitting manner into the gap 9 between the first component 5 and the second component 7 and the first lateral face 11 of which adjoins the inner surface 17 of the first component 5 and the second lateral face 13 of which adjoins the outer surface 21 of the second component 7 facing the first component 5 when the sealing body is inserted into the gap 9.

FIG. 4 shows that the sealing body 3 is adapted to the contour 22 of the outer surface 21 of the second component 7 in a cross-section viewed in parallel to the first component 5 so that the sealing body 3 is formed as an extension of the second component 7 towards the first component 5, if the sealing body 3 is inserted in the gap 9. Therefore, the sealing body 3 is cut out along the contour 22 using a water-jet.

FIG. 5 shows that the sealing body 3 is hollowed out. Consequently, the sealing body 3 is designed open at the two lateral faces 11, 13 and comprises a cavity 23, which is surrounded by a peripheral wall 25, which is adapted to the contour 22 of the outer surface 21 of the second component 7 facing the first component 5. The shape of the cavity 23 is thus adapted to the outer contour of the sealing body 3.

The sealing body 3 is further attached, namely, glued, to a support structure 27, wherein both the sealing body 3 and the support structure 27 comprise the contour 22 of the outer surface of the second component 7. The support structure 27 comprises attaching means 29 in the form of through-holes 29.

Finally, the selected sealing body 3 is inserted into the gap 9 such that the first lateral face 11 at least partially adjoins the inner surface 17 of the first component 5 and the second lateral face 13 at least partially adjoins the outer surface 21 of the second component 7 facing the first component 5. The support structure 27 is attached to the second component 7 by means of screws extending through the through-holes 29.

The product of the process according to the invention is thus a vehicle cabin part 1 having a first component 5 and a second component 7 adjacent to the first component 5, a gap 9 sealed with a sealing body 3 being present between the first component 5 and the second component 7.

FIG. 6 shows the vehicle cabin part 1 produced by the process according to the invention, the vehicle cabin part 1 being an aircraft cabin part 1, in which the first component 5 is designed as a cabin wall and the second component 7 is designed as a seat. A sealing body 3 is inserted into a gap 9 between the first component 5 and the second component 7 adjacent to the first component 5 in the vehicle cabin part 1. The sealing body 3 comprises a first lateral face 11 and a second lateral face 13 opposite the first lateral face 11.

The first lateral face 11 of the sealing body 3 has a shape representing a negative image of the inner surface 17 of the first component 5 facing the second component 7 and adjoining the same in a form-fitting manner. The second lateral face 13 of the sealing body 3 has such a distance 15 from the first lateral face 11 that it is adapted to the outer surface 21 facing the first component 5, resulting in a shape, which is a negative image of the outer surface of the second component 7 facing the first component 5. The sealing body 3 is hollowed out and comprises a cavity 23, resulting in its open design at the first and second lateral faces 11, 13.

The sealing body 3 is attached to a support structure 27, the support structure 27, like the sealing body 3, having the contour 22 of the outer surface 21 of the second component 7 facing the first component 5. This support structure 27 is attached to the outer surface 21 of the second component 7 in a form-fitting manner. The sealing body 3 is provided with a cover, such as leather, fabric or plastic, on the peripheral wall 25, which is visible from the outside.

The process according to the invention for manufacturing a vehicle cabin part 1, wherein a gap 9 between a first component 5 and a second component 7 adjacent to the first component 5 is sealed, has proved to be a particularly efficient manufacturing process. A sealing body 3 suitable for the vehicle cabin part 1 to be manufactured just has to be selected from a plurality of pre-fabricated sealing bodies 3', the first lateral face 11 of the sealing body 3 already having a shape representing a negative image of the complex inner surface 17 of the first component 5 of the respective type of the vehicle cabin part 1. This sealing body 3 only has to be adapted to the shape of the outer surface 21 of the second component 7 facing the first component 5 and be hollowed out by means of computer-controlled water-jet cutting, alternatively by means of a CNC process or 3D printing, before it is inserted in the gap 9.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A process for manufacturing an aircraft cabin part comprising
    providing the aircraft cabin part having a cabin wall and a passenger seat adjacent to the cabin wall, wherein a gap is present between the cabin wall and the passenger seat,
    providing a plurality of different sealing bodies, wherein each of the sealing bodies comprises a first lateral face and a second lateral face opposite the first lateral face, the first lateral face of each of the sealing bodies has a shape that represents a negative image of an inner surface of the cabin wall, and the second lateral face of each of the sealing bodies is a different distance from the first lateral face,
    selecting a suitable sealing body from the plurality of sealing bodies based upon the different distance such that the sealing body fits into the gap between the cabin wall and the passenger seat, and
    inserting the selected sealing body into the gap such that the first lateral face rests against the inner surface of the cabin wall and the second lateral face rests against an outer surface of the passenger seat facing the cabin wall to seal the gap.

2. The process according to claim 1, wherein the selected sealing body is formed from a flexible, foam-like material and
    wherein the selected sealing body is cut out of a sealing body preform using water-jet cutting, based on a three-dimensional model of the inner surface of the cabin wall.

3. The process according to claim 1, wherein the selected sealing body in a cross-section viewed in parallel to the cabin wall, is adapted to the contour of the passenger seat, when the sealing body is inserted into the gap.

4. The process according to claim 3, wherein the selected sealing body is adapted after selection of the sealing body and before the insertion of the sealing body into the gap.

5. The process according to claim 1, wherein the second lateral face of the selected sealing body is formed planar.

6. The process according to claim 1, wherein the second lateral face of the selected sealing body is adapted to the shape of the outer surface of the passenger seat facing the cabin wall.

7. The process according to claim 6, wherein the selected sealing body is adapted to the shape of the outer surface of the passenger seat facing the cabin wall after the sealing body is selected and before the insertion of the sealing body into the gap.

8. The process according to claim 1, wherein the selected sealing body is hollowed out.

9. The process according to claim 8, wherein the selected sealing body is hollowed out to include a cavity, the shape of which is adapted to the outer contour of the sealing body.

10. The process according to claim 1, further comprising attaching the selected sealing body to the passenger seat or to the cabin wall, attaching the sealing body to a support structure, and attaching the support structure to the passenger seat or to the cabin wall.

11. The process according to claim 1, further comprising providing the selected sealing body with a cover.

12. A kit for an aircraft cabin part comprising
    a cabin wall;
    a passenger seat adjacent to the cabin wall, wherein a gap is present between the cabin wall and the passenger seat; and a plurality of sealing bodies configured to be inserted into the gap, where each of the sealing bodies comprises a first lateral face and a second lateral face opposite the first lateral face, wherein the first lateral face of the sealing body has a shape representing a negative image of an inner surface of the cabin wall and is configured to rest against the cabin wall, and the second lateral face of the sealing body has a distance from the first lateral face such that the first lateral face rests against an outer surface of the passenger seat facing the cabin wall and each of the plurality of sealing bodies has a different value of the distance.

13. The kit for an aircraft cabin part according to claim 12, wherein the second lateral face of the sealing body has a shape representing a negative image of the outer surface of the passenger seat facing the cabin wall, and is configured to rest against the cabin wall.

14. The kit for an aircraft cabin part according to claim 12, wherein the sealing body is configured to be attached to the passenger seat or to the cabin wall, the sealing body is configured to be attached to a support structure, and the support structure is configured to be attached to the passenger seat or to the cabin wall.

15. A method to seal a gap between a cabin wall of an aircraft and a passenger seat, the method comprising:

providing sealing bodies each having a first lateral face conforming to the cabin wall and a second lateral face spaced a distance from the first lateral face, wherein the distance varies between the sealing bodies;

selecting one of the sealing bodies based on a gap between the cabin wall and the passenger seat, wherein the selected sealing body has a value of the distance similar to the gap; and inserting the selected sealing body into the gap.

16. The method of claim 15 further comprising repeatedly selecting one of the sealing bodies and inserting the selected sealing body for multiple passenger seat rows in the aircraft cabin.

17. The method of claim 15 wherein the sealing bodies are each formed of a deformable material and the insertion includes deforming the selected sealing body into the gap.

18. The method of claim 15 wherein at least one of the sealing bodies has a cavity in the second lateral face and the selection includes selecting one of the sealing bodies having a cavity conforming to a shape of a side of the passenger seat.

19. The method of claim 15 wherein the selected one of the sealing bodies is a sealing body preform and the method further comprises:

cutting material from the first lateral face or the second lateral face of the sealing body preform to shape the sealing body preform to conform to the gap.

* * * * *